United States Patent
Lastras-Montano

(10) Patent No.: US 7,471,219 B1
(45) Date of Patent: Dec. 30, 2008

(54) LOW LATENCY CONSTRAINED CODING FOR PARALLEL BUSSES

(75) Inventor: Luis A. Lastras-Montano, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/846,795

(22) Filed: Aug. 29, 2007

(51) Int. Cl.
*H03M 7/02* (2006.01)
(52) U.S. Cl. .......................... 341/83; 341/50
(58) Field of Classification Search .............. 341/50–90
See application file for complete search history.

(56) References Cited

U.S. PATENT DOCUMENTS

| | | | |
|---|---|---|---|
| 5,513,135 | A | 4/1996 | Dell et al. |
| 5,572,736 | A | 11/1996 | Curran |
| 5,874,833 | A | 2/1999 | Perry et al. |
| 6,252,956 | B1 * | 6/2001 | Karino ................. 379/279 |
| 6,381,685 | B2 | 4/2002 | Dell et al. |
| 6,701,404 | B1 * | 3/2004 | Hamre et al. ............ 710/307 |
| 6,732,214 | B1 | 5/2004 | Cohen et al. |
| 6,763,406 | B1 | 7/2004 | Devanney et al. |
| 6,834,335 | B2 | 12/2004 | Fallah et al. |
| 6,933,863 | B2 | 8/2005 | Visalli et al. |
| 7,043,670 | B2 | 5/2006 | Alani et al. |
| 7,139,852 | B2 | 11/2006 | LaBerge |
| 7,205,815 | B2 | 4/2007 | Park |
| 7,296,091 | B1 * | 11/2007 | Dutta et al. ............. 709/245 |

| | | |
|---|---|---|
| 2007/0005282 | A1 | 1/2007 Messier |

FOREIGN PATENT DOCUMENTS

| | | |
|---|---|---|
| EP | 0186385 A2 | 7/1986 |
| JP | 2001274846 A | 10/2001 |

OTHER PUBLICATIONS

Brhambatt, et al. "Adaptive Low-Power Bus Encoding Based On Weighted Code Mapping". IEEE 0-7803-9390-2/06 ISCAS. Feb. 2006. pp. 1739-1742.
Stan, et al. "Bus-Invert Coding for Low-Power I/O". IEEE Transactions on Very Large Scale Integration. vol. 3, No. 1. Mar. 1995. pp. 49-58.
Campello, et al. "Constrained Systems With Unconstrained Positions". IEEE Transactions on Information Theory. vol. 48, No. 4. Apr. 2002. pp. 866-879.

(Continued)

*Primary Examiner*—Lam T Mai
(74) *Attorney, Agent, or Firm*—Cantor Colburn LLP; Lynn Augspurger

(57) ABSTRACT

A system and method for providing low latency constrained coding for parallel busses. The method includes receiving a value for a number of transfers and a number of possible constrained patterns between adjacent transfer rows. Data to be encoded is received. The data is converted into indices of constrained patterns, the converting including a number base change into a new base. The new base is chosen so as to optimize the number of operations required to perform the converting subject to the new base being at least as large as the number of possible constrained patterns between adjacent transfer rows. The indices of the constrained pattern are converted into encoded data. The encoded data is then output.

20 Claims, 10 Drawing Sheets

OTHER PUBLICATIONS

Sotiriadis, et al. "Energy Reduction in VLSI Computation Modules: An Information Theoretic Approach". IEEE Transactions on Information Theory. vol. 49, No. 4. Apr. 2003. pp. 790-808.

Cover, Thomas M. "Enumerative Source Encoding". IEE Transactions on Information Theory. vol. IT-19 No. 1. Jan. 1973. pp. 73-77.

Poo, et al. "Tradeoff Functions For Constrained Systems With Unconstrained Positions". IEEE Transactions on Information Theory. vol. 52, No. 4. Apr. 2006. pp. 1425-1449.

Babvey, Sharareh. "Delay and Power Reduction in Deep Submicron Buses". Georgia State University. May 2005. 67 pgs.

van Wijngaarden, et al. "Maximum Runglength-Limited Codes with Error Control Capabilities". IEEE Journal on Selected Areas in Communications. vol. 19, No. 4. Apr. 2001. pp. 602-611.

Cheng, et al. "Memory Bus Encoding for Low Power: A Tutorial". IEEE 0-7695-1025-6-01. Jun. 2001. pp. 199-204.

* cited by examiner

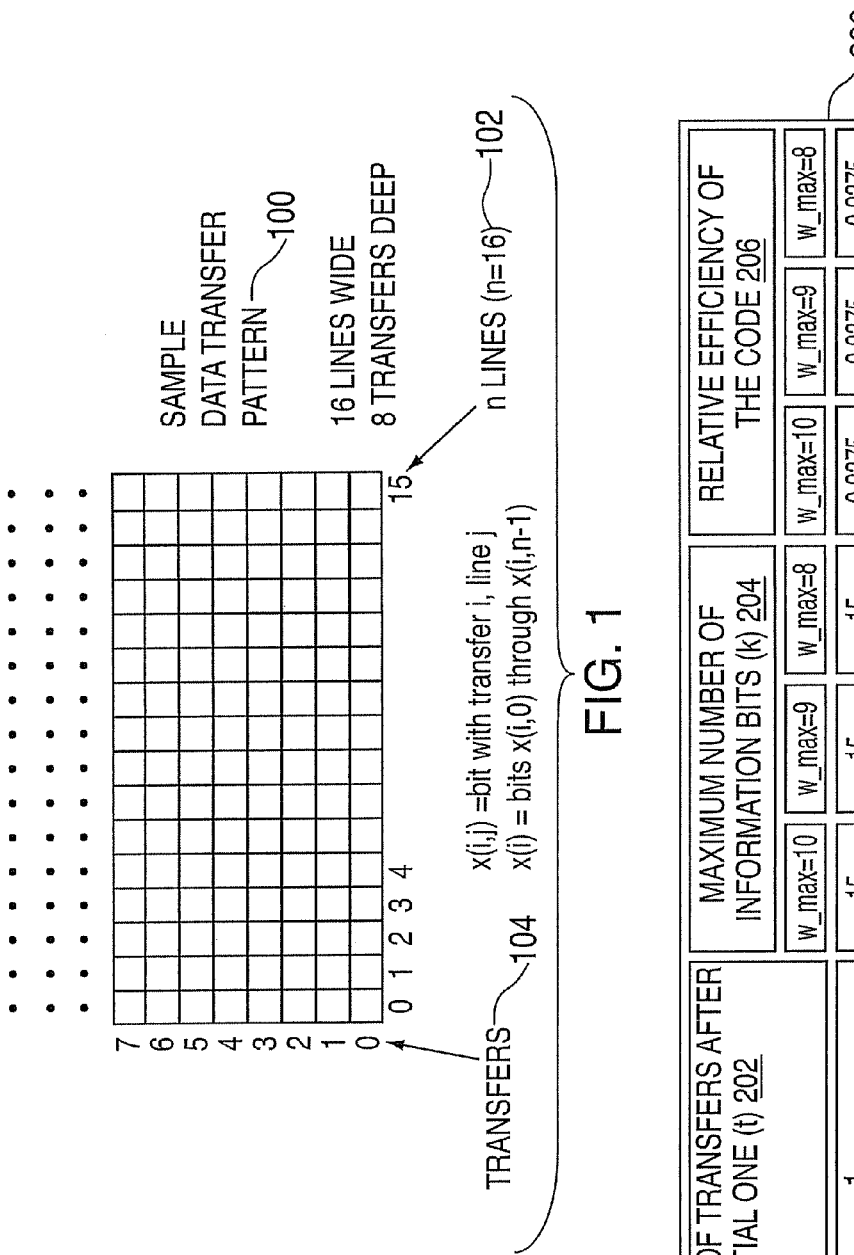

LOW LATENCY CONSTRAINED CODING FOR PARALLEL BUSSES

BACKGROUND OF THE INVENTION

This invention relates generally to computer memory, and more particularly to providing low latency constrained coding for parallel busses.

Significant impairments to signal integrity can occur on an electrical parallel bus when certain data patterns occur. For example, simultaneous switching of a large fraction of data inputs is a significant source of noise in a single-ended transmission bus. Reducing the number of transitions can reduce noise as well as have a positive effect on transmission power consumption.

The most well known solution for reducing the number of transitions is to add an additional signal pin to the bus. Then it is determined if more than half of the pins would switch if the pending data is sent through the bus. If more than half of the pins would switch, then the data is inverted and the additional pin is used to transmit information about the inversion. An advantage of this solution is that it is very simple. A disadvantage of this solution is the cost of the additional pin, which must be added to every bus on which the encoding will be applied.

BRIEF SUMMARY OF THE INVENTION

An exemplary embodiment of the present invention includes a method for providing low latency constrained coding for parallel busses. The method includes receiving a value for a number of transfers and a number of possible constrained patterns between adjacent transfer rows. Data to be encoded is received. The data is converted into indices of constrained patterns, the converting including a number base change into a new base. The new base is chosen so as to optimize the number of operations required to perform the converting subject to the new base being at least as large as the number of possible constrained patterns between adjacent transfer rows. The indices of the constrained pattern are converted into encoded data. The encoded data is then output.

Another exemplary embodiment includes a system for providing low latency constrained coding for parallel busses. The system includes an outer encoder for converting the data into indices of constrained patterns. The converting includes a number base change into a new base. The new base is chosen so as to optimize the number of operations required to perform the converting subject to the new base being at least as large as the number of possible constrained patterns between adjacent transfer rows. The system also includes inner encoders to convert the indices of the constrained pattern into encoded data and output the encoded data.

A further exemplary embodiment includes a hub device in a memory system. The hub device includes an interface to one or more memory devices via one or more parallel memory device busses. The hub device also includes an interface to a memory bus for receiving data and an outer encoder for converting the data into indices of constrained patterns. The converting includes a number base change to a new base, the new base chosen so as to optimize the number of operations required to perform the converting subject to the new base being at least as large as the number of possible constrained patterns between adjacent transfer rows. The hub device also includes a plurality of inner encoders for converting the indices of the constrained pattern into encoded data and for outputting the encoded data to one or more of the parallel memory device busses.

BRIEF DESCRIPTION OF THE DRAWINGS

Referring now to the drawings wherein like elements are numbered alike in the several FIGURES:

FIG. 1 depicts a data transfer that may be utilized by an exemplary embodiment of the present invention;

FIG. 2 is a table that illustrates the maximum number of information bits and relative efficiency of various types of constrained data patterns for the case where the number of lines equals sixteen;

DETAILED DESCRIPTION OF EXEMPLARY EMBODIMENTS

Figure 3:
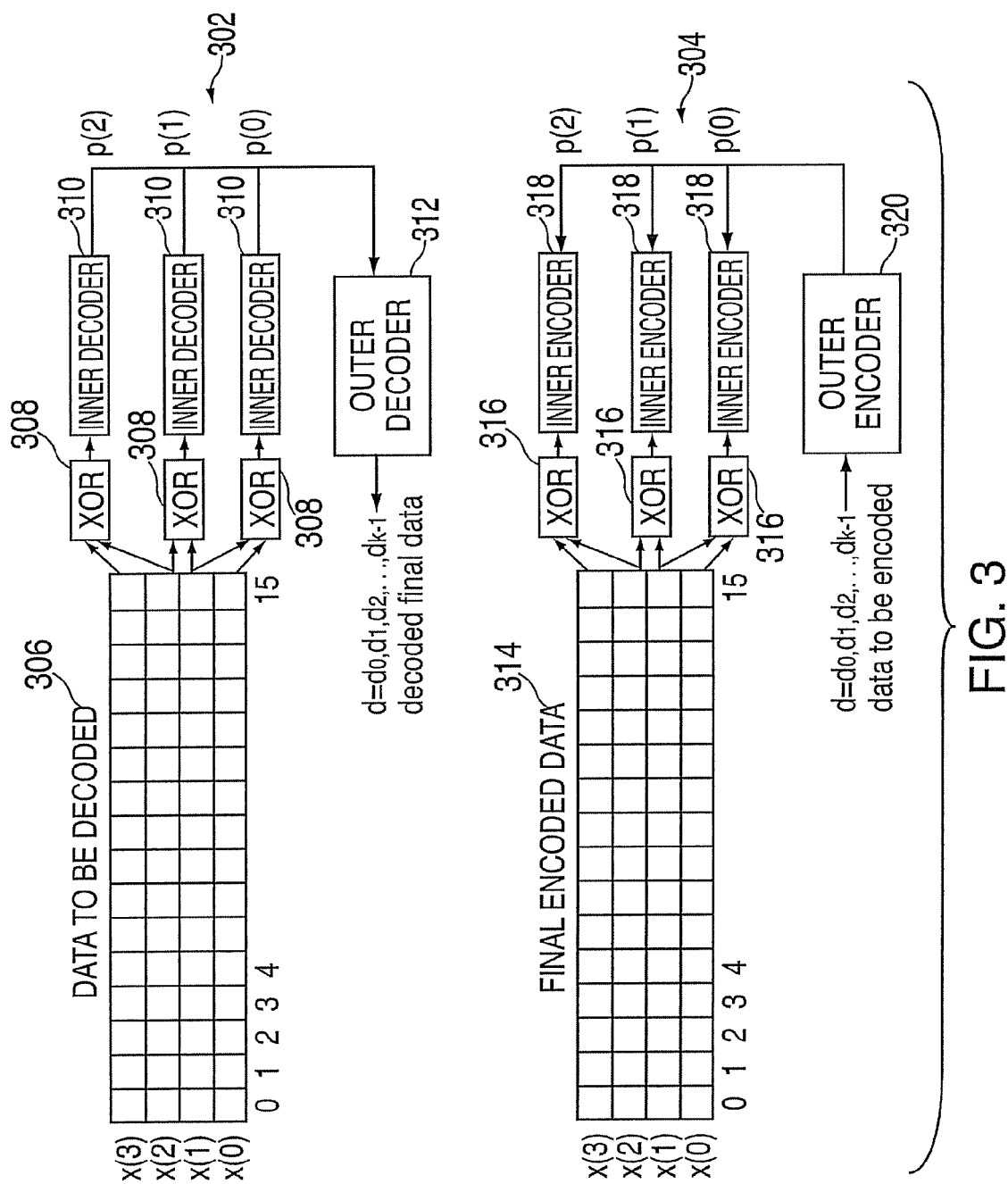
FIG. 3 depicts an encoder and a decoder that may be utilized by an exemplary embodiment.

In an exemplary embodiment of the present invention, efficient constrained codes are obtained by gathering data for the encoding and by employing tradeoffs such as varying the maximum transition weight parameter. Exemplary embodiments provide a general method for obtaining an efficient implementation of a constrained code that is suitable for use on high-speed hardware and has low latency implications.

FIG. 1 depicts a data transfer pattern 100 on a 16 bit wide parallel bus that may be utilized by an exemplary embodiment of the present invention. The width of the bus in FIG. 1 is 16 lines 102 and the depth of the data transfer pattern is 8 transfers 104. As utilized herein, x(i,j) refers to the bit in the $i^{th}$ transfer on the $j^{th}$ line (or wire) and x(i) refers to the vector comprised of all of the bits in the $i^{th}$ transfer. In an exemplary embodiment, it is assumed that the vector x(0) can have any of $2^n$ (where n is equal to the number of lines in the parallel bus) possible bit patterns (i.e., x(0) is not constrained). In an exemplary embodiment, adjacent vectors x(i) and x(i+1) do not differ by more than w_max bit positions (this is referred to herein as a limited weight transition constraint). The number of distinct constrained patterns that can be encoded in the transmission pattern after t transfers beyond the first one is computed with the formula $$M(n, w_{max}, t) = \left(\sum_{i=0}^{w_{max}} \binom{n}{i}\right)^t$$

For given values of n, t and w_max, in principle, the value of $$\lfloor \log_2 M(n, w_{\max}, t) \rfloor = \left\lfloor t\log_2 \sum_{i=0}^{w_{\max}} \binom{n}{i} \right\rfloor$$

information bits can be associated to one of the constrained patterns. The letter d is used herein to refer to the information being encoded and which may be mapped to multiple transfers of a parallel bus, or to a transfer over a set of parallel buses or more generally to multiple transfers across a set of parallel buses. The above association is referred to herein as a constrained code (specifically, a constrained code of a limited weight transition type). FIG. 2 is a table 200 that illustrates the maximum number of information bits that can be encoded in various types of constrained data patterns for the case when n=16. The table 200 includes a column indicating the number of transfers after the initial one (t) 202; a column indicating the maximum number of information bits (k) 204 for selected values of t and w_max; and a column indicating the relative efficiency of the code 206 for each value of t.

The relative efficiency of the code 206 is defined as the number of information bits that can be encoded in a constrained data pattern divided by the actual number of bits that comprise the constrained pattern. In this ratio, the unconstrained n bits of the first transfer are discounted from both the numerator and denominator. As can be seen from the table 200, the efficiency of the code improves if the code takes into account a larger number of transfers. For example, in the case w_max=8 and t=1, the optimum efficiency of a code is 15/16, which can be implemented with the simple "bus invert" code which uses one bit out of the 16 bits to denote whether the rest of the 15 bits have been inverted. On the other hand, if the 15 transfers after the initial transfer are taken into account then an efficiency of 19/20 can be achieved. Similar results apply to other values for w_max as depicted in the table 200 in FIG. 1.

There are situations in which very efficient codes are desirable. The simple bus invert constrained code for the case of t=1 when the maximum transition weight is half of the original data width currently has no known counterparts in general when larger values for t are employed. An exemplary embodiment of the present invention as described herein provides implementations of such constrained codes that are specifically suitable for hardware and low latency communication.

As used herein, the number of distinct constrained patterns between adjacent rows that are actually used for the encoding is denoted by m, and must satisfy: $m \leq M(n, w_{max}, 1)$.

It is assumed temporarily that there exists a hardware function to map a weight constrained pattern of n bits to an index in $\{0, \ldots, m^{-1}\}$ and vice versa. These functions are referred to herein as the inner decoder and encoder, respectively for reasons that shall be apparent shortly. A technique for implementing such hardware functions that is based on the technique of enumerative source coding is described below herein. It is assumed that all possible constrained transition patterns are indexed (such an indexing is provided by the enumerative source coding). The index of the constrained pattern x(i) XOR x(i+1) is denoted by p(i). The information bits that need to be encoded in the t transfers are denoted by:

$d=(d_0 d_1 \ldots d_{k-1})$, where k is equal to the number of information bits.

In addition to the inner decoder and encoder alluded to above, a technique for mapping the received data x(0), ..., x(t) to the indices of the constrained patterns p(0), p(1), ..., p(t−1) and vice versa is required. These are termed the outer decoder and the outer encoder respectively. This description is summarized in FIG. 3 for an exemplary case where n=16 and t=3. FIG. 3 depicts a decoder 302 that receives data to be decoded 306 and inputs each set of bits in transfer x(i) and transfer x(i+1), where i=1 to 3 into XOR gates 308. The outputs of the XOR gates 308 are input to a plurality of inner decoders 310. The output of the inner decoders 310 includes p(2), p(1), and p(0) which are input to an outer decoder 312. Output from the outer decoder 312 is the decoded data, d.

FIG. 3 also depicts an encoder 304 which receives the data to be encoded, d, into an outer encoder 320. Output from the outer encoder 320 includes indices of the constrained pattern (p(0), p(1), and p(2)) which are input to a plurality of inner encoders 318. Outputs from the inner encoders 318 are input to a plurality of XOR gates 316 for output as the final encoded data 314.

Following are descriptions of exemplary implementations for the outer decoder 312 and the outer encoder 320. It is worth noting that these are completely agnostic to the type of constraint being employed (in this example a limited transition weight constraint) and therefore exemplary embodiments are generally applicable to other situations where different constraints are required. An example of a different constraint is one in which in addition to requiring a maximum transition weight, a minimum transition weight is also specified, which may be useful to align clocks in both ends of the transmission medium.

Following is an embodiment of the outer decoder 312 that may be implemented by an exemplary embodiment. The algorithm for computing d from the received data transfers x(0), ..., x(t) is as follows: 1) Compute {p(0), p(1), ..., p(t−1)} via the equation p(i)=x(i) XOR x(i+1) where the XOR is computed elementwise; and 2) Compute: $d=p_0+mp_1+m^2p_2+ \ldots +m^{t-1}p_{t-1}$. Throughout this text, p(i) and $p_i$ are equivalent. In an exemplary embodiment of step 2, each of the summands are computed independently through multiplication, and then added together. In any of these multiplications one of the factors is known in advance which simplifies the associated hardware. The multiplication can be accomplished by adding shifted versions of p(i). In an alternate exemplary embodiment of step 2, the order of the computations implied by $d=p_0+m(p_1+m(p_2+(\ldots+mp_{t-1})))$ is utilized.

Figure 4:
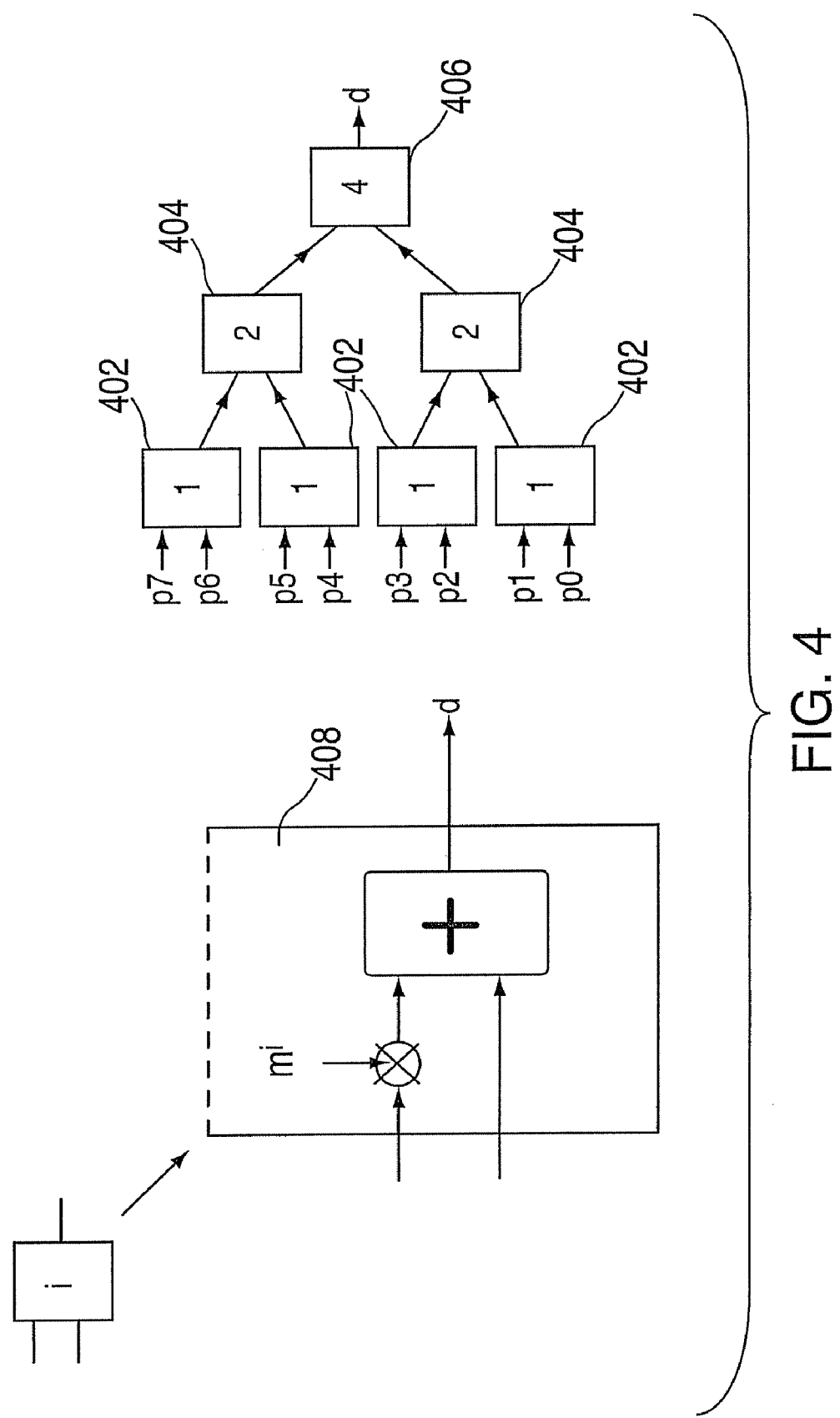
FIG. 4 depicts a block diagram of circuitry in a tree structure that may be utilized to implement an outer decoder in an exemplary embodiment.

In general, different factorizations will yield different implementations, and it is the task of the designer to choose an appropriate form. A form that is of particular interest is most easily illustrated when t is a power of 2. In this case, one may use a tree-like computation such as the one depicted in FIG. 4 to obtain d for the case when t=8. Inputs to the tree structure include: p(i), where i=0 to 7, m, and i. The output is the data bits, d. The advantage of this computation form is that more computations can proceed in parallel, thereby diminishing the decoding latency from t to approximately $\log_2 t$. Clearly, the tree need not be binary at any level and the number of inputs need not be a power of an integer to obtain similarly advantageous implementations. At block 408, two inputs are received, and one of them (the one in the top) is multiplied times $m^i$, and the result is added with the input on the bottom. In an exemplary embodiment, t=8 and block 408 is used seven times in a tree-like arrangement as shown in FIG. 4. The blocks labeled 402 each multiply the top input times m, add the result to the bottom input and output the result of the addition. Block 404 multiplies the top input times $m^2$ and then proceeds similarly. Block 406 multiplies the top input times $m^4$ and then proceeds similarly.

Following is an embodiment of the outer encoder 320 that may be implemented by an exemplary embodiment to compute the indices of the constrained patterns (or pattern) (p(0), p(1), . . . , p(t−1)) from the data to be encoded, d. Exemplary embodiments implement what is in essence a base change operation, in which the original representation of d is in base 2 and the desired representation is in base m. Let (dim) denote the result of the integer division d/m, and let d mod m denote the remainder of the division. The standard algorithm for base change sets are denoted as:

$p_0 = d \mod m$ $p_1 = (d|m) \mod m$ $p_2 = ((d|m)|m) \mod m$

.

.

.

Performing this sequence of division operations can be particularly costly. Nevertheless, the numerator in these divisions is a known number and thus, the division can be thought of as a multiplication instead. However, unlike the multiplications in the decoder, in this case the known number that must be multiplied by potentially has an infinite binary representation. For example, M(16,10,1)=58651 and thus setting m=58651, it is determined that dividing by m is the same as multiplying times 1/m=1/58651=0.(0)$^{15}$1000111100000110 . . . . One approach to solving this problem is to truncate the expansion above when doing the multiplication (in lieu of the division). Thus, the division may not give the correct result; nevertheless by controlling the degree of the truncation it can be ensured that the result of the division is known within a desired precision. More generally, an exemplary embodiment divides by a number of the form $$\hat{m} = \frac{1}{b_0 2^{-1} + b_1 2^{-2} + b_2 2^{-3} + \ldots + b_{r-1} 2^{-r}}$$

where bi is either 0 or 1, if few of the factors b0, b1, . . . , b(r−1) are equal to one. Division by this number is equivalent to multiplication by the inverse, which can be accomplished by a shift and add operations.

Delta is defined by the equation $\hat{m}=m+\delta$. It is assumed that $\delta>0$ (a similar procedure can be applied when $\delta<0$). The error when dividing a number "a" by $\hat{m}$ instead of m can be written as $$\frac{a}{m} - \frac{a}{m+\delta} = \frac{a\delta}{m(m+\delta)}.$$

This difference is always positive. In one exemplary embodiment, it is required that the difference is always less than 1. This way, the result of the division will be either correct or one less than the true value. Taking the result of the division, multiplying times m and subtracting from "a" results in the remainder. A simple comparison can then determine whether the remainder is m or bigger, in which case m is subtracted from the remainder and the result of the division is incremented by one.

In an exemplary embodiment, the equation above can be used to calculate the degree of approximation required to implement the division using the procedure described above. First, the largest possible value for "a" is predetermined (this largest value of "a" will result in the largest approximation error). Then the largest $\delta$ for which the approximation still holds is determined:

$$\delta_{\max} \leq \frac{m^2}{a_{\max} - m}.$$

Next, an m^ that differs by no more than $\delta_{max}$ is calculated. The division can then be implemented as described above. Suppose it is required to divide by m=M(16,10,1)= 58651 a number that is at most a_{max}=m$^2$. Then, $\delta_{max} \leq 1.000017$ . . . is obtained by setting $$\frac{1}{\hat{m}} = 0 \cdot (0)^{15} 100011110000011.$$

Next, $\delta = \hat{m} - m = 0.9814$ . . . and thus the above satisfies the restriction on $\delta$.

In an alternate exemplary embodiment, another technique is utilized to reduce the complexity of the division operation. This is based on the observation that in general, there will be ample choice for the value of m and one may be chosen that gives a suitable low complexity implementation. This is illustrated with the following specific example. The general methodology of the exemplary embodiment can be extrapolated from this example. Assume that n=16, w_max=10, and t=3. Then, from the previous table it is known that the maximum, k, of information bits encoded in x(1), x(2) and x(3) (assuming knowledge of x(0)) is k=47. This is because log$_2$ M(16, 10,3)=3 log$_2$ M(16,10,1)=3 log$_2$ 58651=47.5196 . . . which is rounded down to an integer number of bits. Thus, the set of constrained patterns in fact can encode more information than can be provided in an integer number of bits. There are a number of ways to take advantage of this; for example the additional messages could be used to encode control/protocol information for the transmission or storage medium. In an exemplary embodiment of the present invention, the additional space is employed to tune m so as to allow for a simpler implementation.

Next, m is chosen from the range $2^{47} \leq 52016^3 \leq m^3 \leq 58651^3$ and m^ is selected so that $$\frac{1}{\hat{m}} = 0 \cdot (0)^{15} 10001.$$

Thus, $\hat{m}=58254.222$ . . . and m is set to 58254. Division by this value of m is significantly simpler than in the earlier example that had set m=58651 (the complexity is measured by the fact that the new division can be accomplished with 2 shift-and-adds, whereas in the previous case it required 7). In this particular example, the new value for m is not much smaller than the previous one, thus still giving ample room for utilizing some messages to transmit control or protocol information instead of data when so desired.

Figure 5:
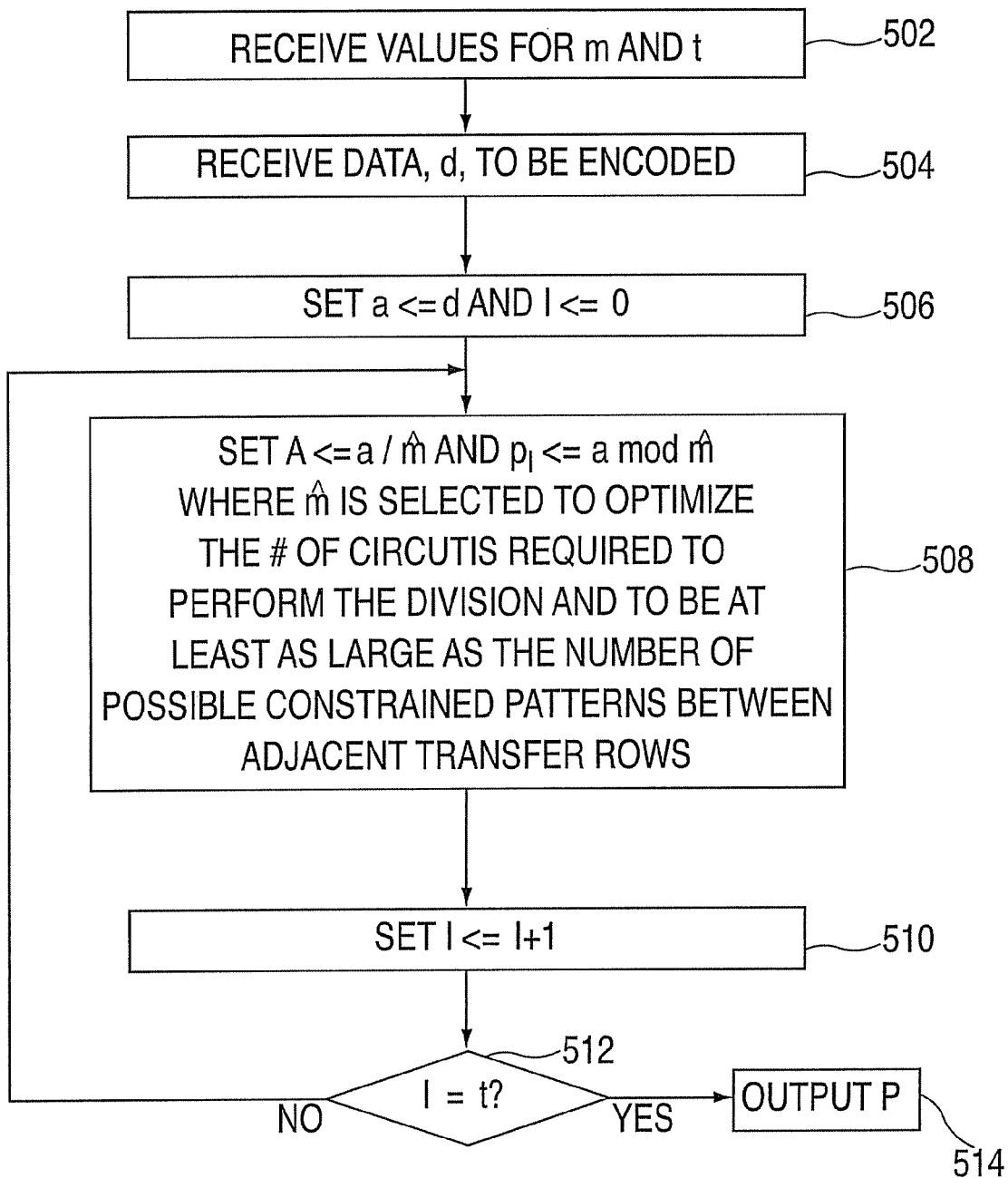
FIG. 5 depicts a process flow of an outer encoder that may be implemented by an exemplary embodiment.

To summarize, FIG. 5 depicts a process flow of an outer encoder that may be implemented by an exemplary embodiment to convert data to be encoded into indices of a constrained pattern using a base change operation. At block 502, values for "m" and "t" are received by the encoder, and at block 504, the data to be encoded is received. At block 506, "a" is set to the data and "I" is set to zero. At block 508, $P_I$ is set to the remainder of "a" divided by $\hat{m}$, and "a" is set to the integer result of "a" divided by $\hat{m}$. As described previously, $\hat{m}$ is selected to optimize the number of circuits required to perform the division and to be sufficiently close to "m" so that the result of an integer division by $\hat{m}$ differs by little from an integer division by m, and so that the correct result of the division by m can be inferred from the result of the division by $\hat{m}$ by a simple circuit. Thus, $\hat{m}$ is selected to be at least as large as the number of possible constrained patterns between adjacent transfer rows. Next, at block 510, "I" is set to "I+1". At block 512 it is determined if "I" is equal to "t". If "I" is equal to "t", then the conversion is complete and the indices of the constrained pattern is output at block 514. If "I" is not equal to "t", then block 508 is performed. Using this recursive division and calculation of remainders results in changing the data, d, from base 2 into the indices of the constrained patterns represented in base "m".

Figure 6:
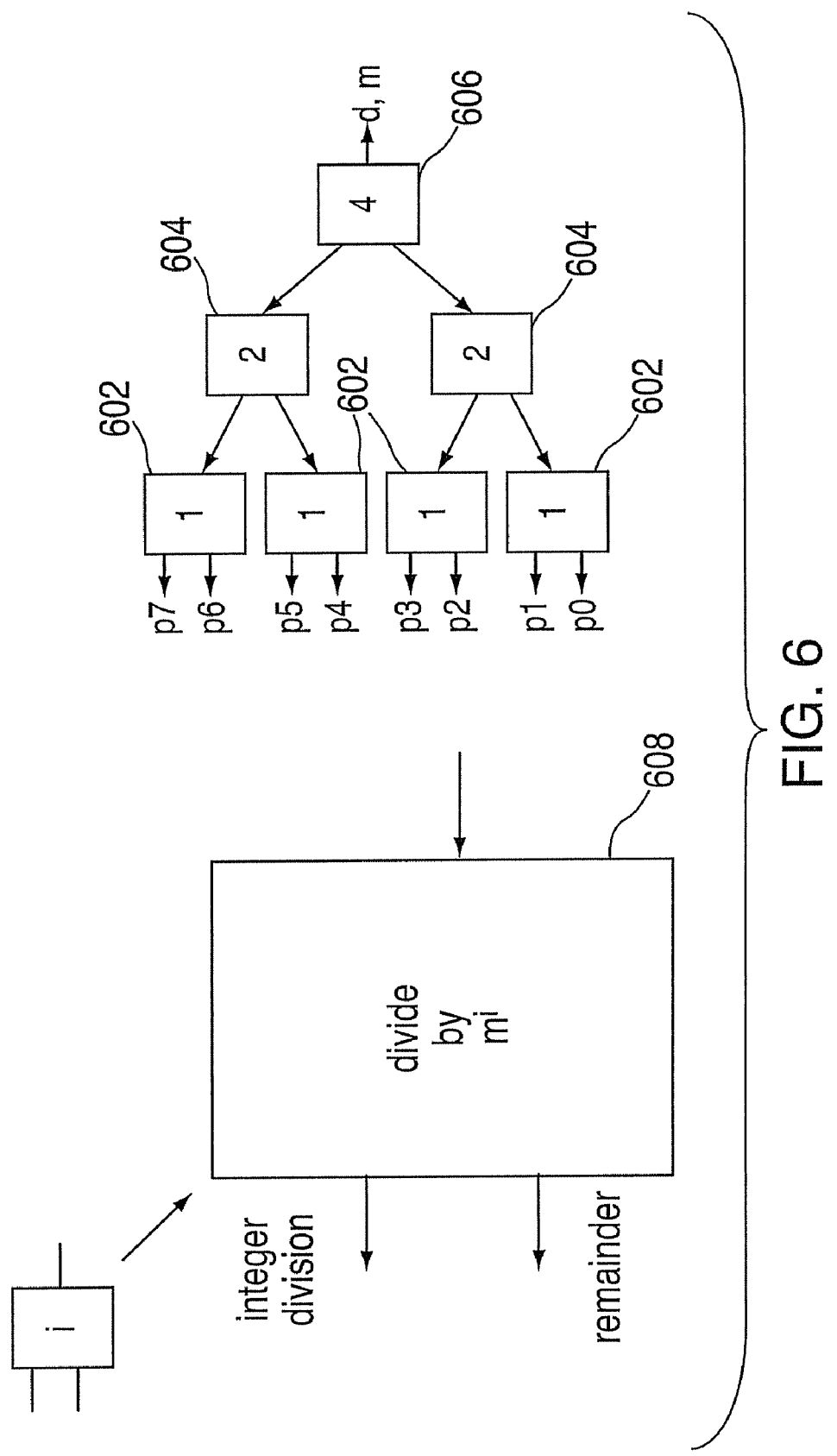
FIG. 6 depicts a block diagram of circuitry in a tree structure that may be utilized to implement an outer encoder in an exemplary embodiment.

In an exemplary embodiment, the computations in the encoder are organized as computations in a tree (in a manner similar to the decoder as described previously) so that the use of parallel circuits results in a logarithmic encoding delay, rather than a linear encoding delay. FIG. 6 depicts a tree structure that may be implemented by an exemplary embodiment for the case when t=8. Inputs to the tree structure include: d, m and i. The output is p(i), where i=0 to 7. Note that division by $m^i$ may be accomplished by successive divisions by m as described above or by devising a special circuit using the complexity reduction techniques described above. At block 608, the input is divided by $m^i$ and the result of the integer division and the remainder are output. In an exemplary embodiment where t=8, block 608 is employed seven times with these blocks arranged a tree structure as shown in FIG. 6. The blocks labeled 602 each take an input and produce the result of the integer division by m and the associated remainder. The blocks labeled 604 each take an input and produce the result of the integer division by $m^2$ and the associated remainder. The blocks labeled 606 each take an input and produce the result of the integer division by $m^4$ and the associated remainder.

In an exemplary embodiment, for a complete implementation, the inner encoder 318 and the inner decoder 310 depicted in FIG. 3 are obtained through technique called enumerative source coding. A goal of an exemplary embodiment is to find a simple way to map an index in $\{0, \ldots, m^{-1}\}$ to a constrained pattern of length n and vice versa. In enumerative source coding, constrained patterns are listed in lexicographic order (for example, it is assumed that 0<1 and that the least significant bit in a constrained pattern is the rightmost bit). The formula for computing the index of a pattern c is then:

$$i_s(c) = \sum_{j=1}^{n} x_j n_s(c_1, c_2, \ldots, c_{j-1}, 0)$$

where n_s(c_1, c_2, ..., c_{j-1}, 0) denotes the number of patterns c whose first j bits match the pattern (c_1, c_2, c_{j-1}, 0).

Figure 7:
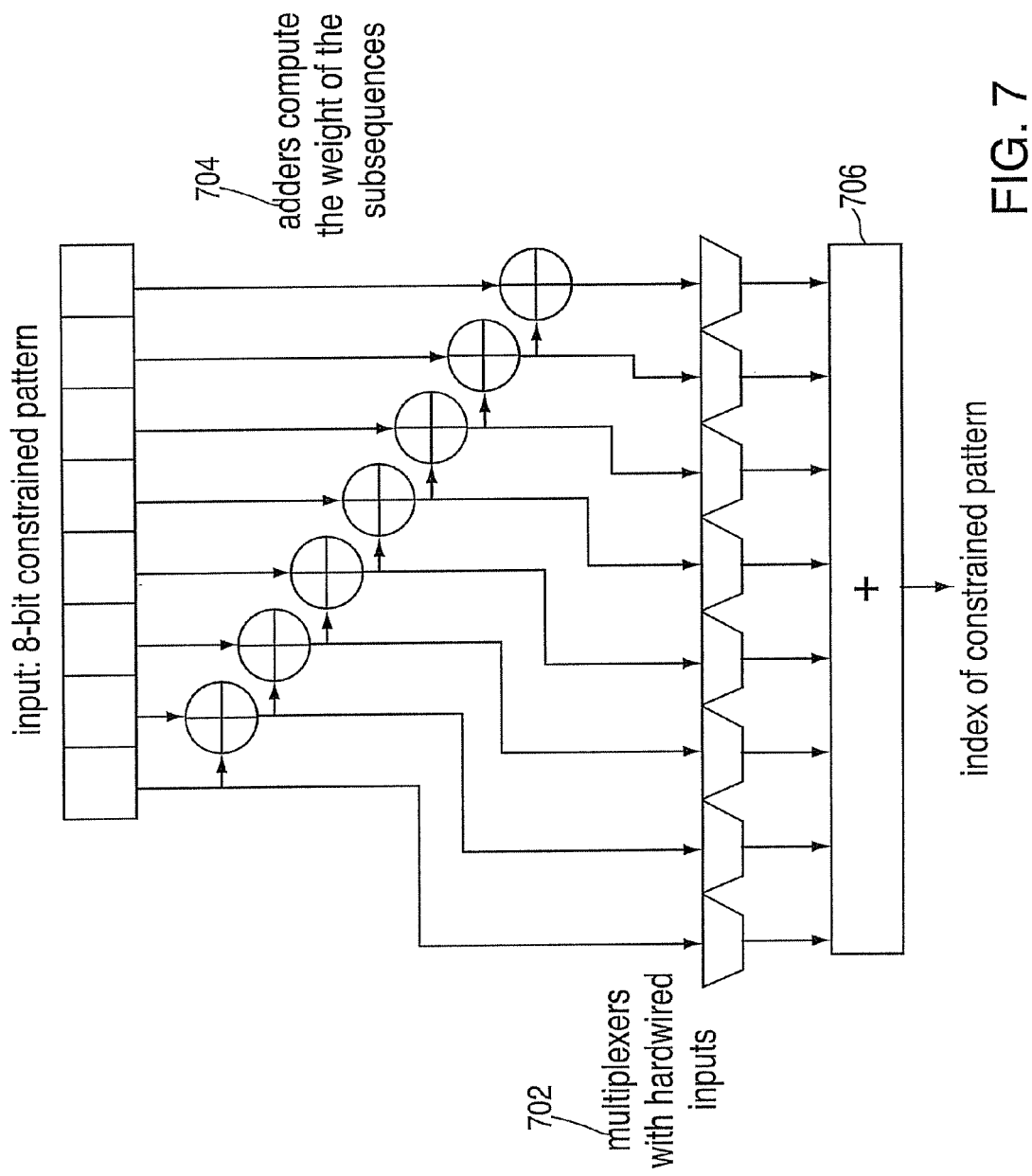
FIG. 7 depicts a circuit that may be utilized to pre-compute the index of a constrained pattern in an exemplary embodiment.

In the particular case of the limited transition weight constraint, the formula $$n_s(c_0, c_1, \ldots, c_{j-2}, 0) = \sum_{i=0}^{w_{\max} - weight(c, j-1)} \binom{n-j}{i},$$

where weight(c, j−1) denotes the number of ones in the first j−1 digits of the pattern c. Note that the expression above is really only a function of j and weight(c, j−1). Thus by pre-computing the consecutive sums of consecutive combinatorials, the circuit depicted in FIG. 7 may be utilized to compute the index of the constrained pattern (for n=8 in the example depicted in FIG. 7). An 8 bit constrained pattern is input to the circuit depicted in FIG. 7. Adders 704 compute the weight of the sub-patterns. Outputs from the adders 704 are input to multiplexers 702 that have hard wired inputs which are then input to an adder 706 for generating an index of the constrained pattern. To compute the constrained pattern associated with a given index pattern, and exemplary embodiment utilizes the inverse function described in an article written by T. M. Cover, entitled "Enumerative Source Coding", IEEE Transactions on Information Theory, Vol. IT-19, No. 1, January 1973, pages 73-77. A circuit can be devised that implements the required function in a manner similar to the circuit depicted in FIG. 7 above.

Figure 8:
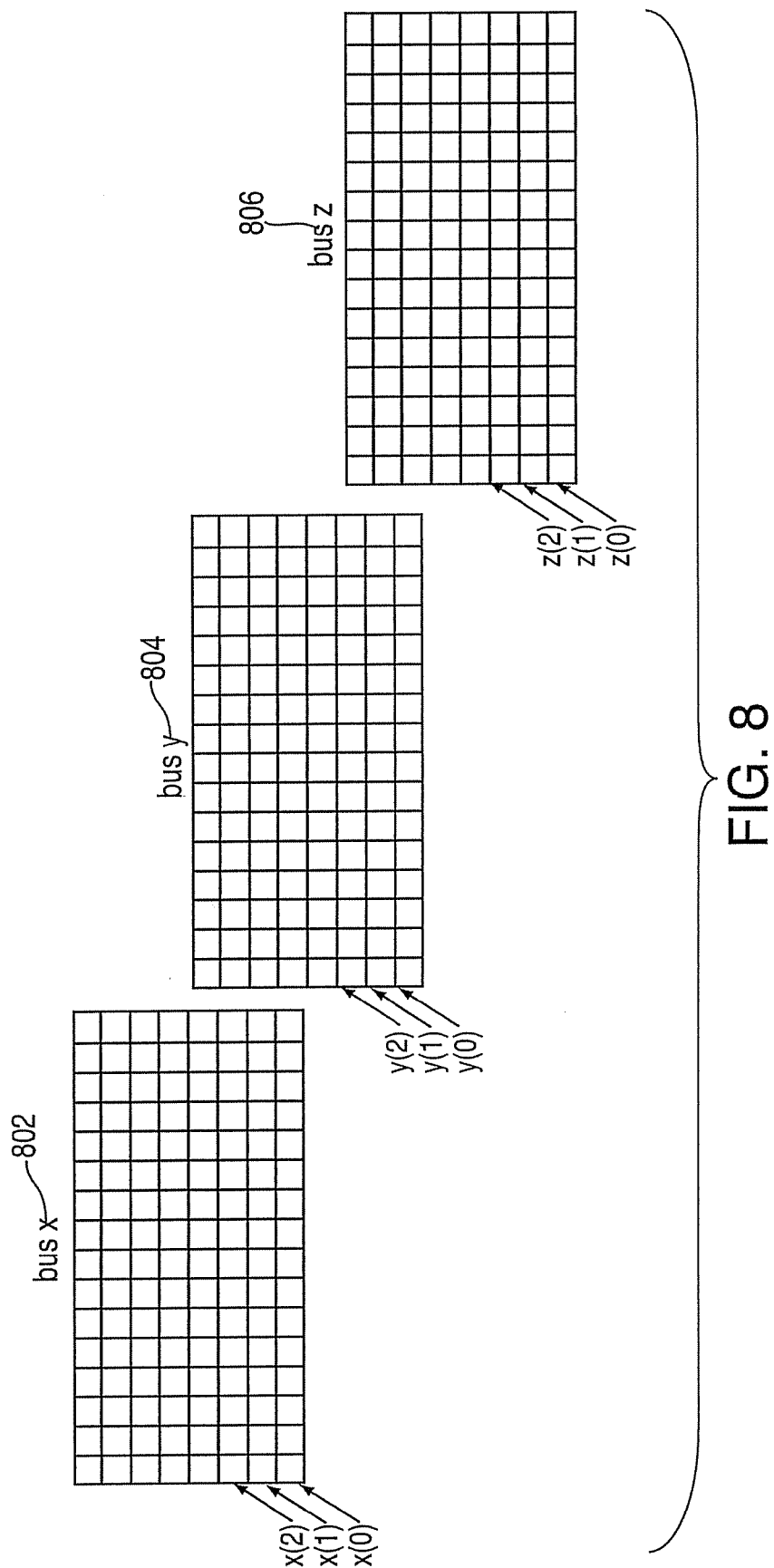
FIG. 8 depicts a maximum transition weight being distributed over three busses that may be implemented by an exemplary embodiment.

An exemplary embodiment of the present invention is utilized for creating constrained codes for multiple parallel busses. An exemplary embodiment described previously requires x(0) and all of the constrained data patterns x(1), ..., x(t) before decoding. Similarly, the entire message is required in order to produce the constrained data pattern. The associated latency may be undesirable in some situations. Such latency can in fact be reduced in the case there are several parallel buses and a requirement for limited transition weight constraints on each bus individually. Consider, for example, the case when n=16, and there are three buses (bus x 802, bus y 804, and bus z 806) over which it is required to have a maximum transition weight w_max, as illustrated in FIG. 8. Suppose that it is determined that using t=3 transfers beyond the first one would result in an acceptable code efficiency ratio, but that it is desired to avoid the latency of having to buffer x(0) x(1) x(2) x(3) on bus x 802 before producing the decoded data (with a similar statement holding for bus y 804 and bus z 806).

Figure 9:
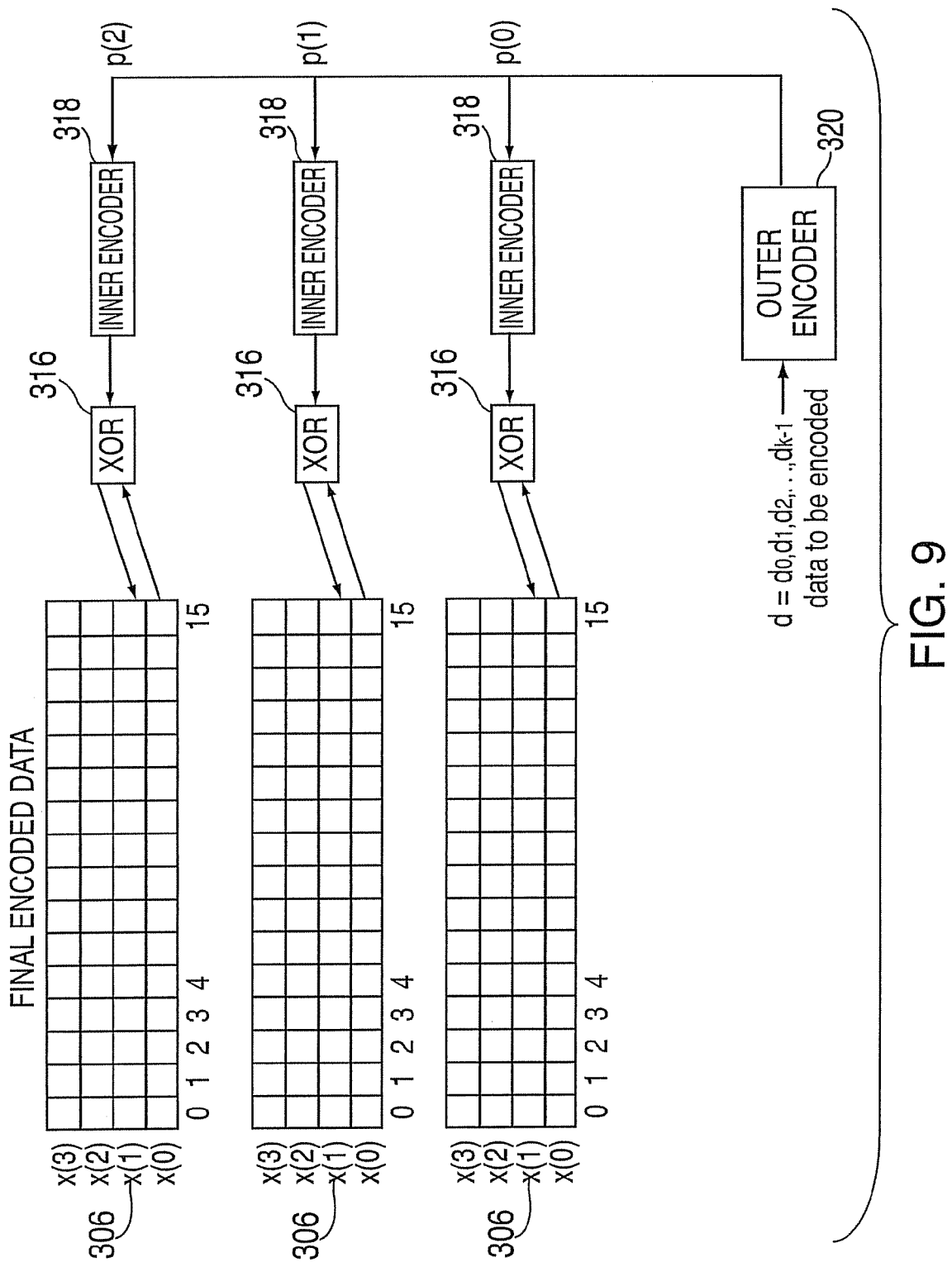
FIG. 9 depicts an encoder that may be implemented by an exemplary embodiment.

The idea is to compute the constrained transition patterns x(1) XOR x(0), y(1) XOR y(0) and z(1) XOR z(0) instead when applying the algorithm of an exemplary embodiment of the present invention as described herein. Such patterns can be computed directly by an appropriate number of input bits. The constrained transition patterns are then XORed with x(0), y(0) and z(0) individually. In this manner, latency is reduced to its minimum. In an exemplary embodiment, decoding takes place in a similar fashion. FIG. 9 depicts an encoder that may be utilized to implement distributing the constrained pattern across the same transfer in multiple parallel busses 306 (in this case 3). It is similar to the encoder depicted in FIG. 3, except that the output from the XOR gates 316 are input to the same transfers in different parallel busses 306.

The above is possible because the essential algorithmic difficulty is to determine the constrained transition patterns that are independent of the data in the bus to which they will be XORed to produce the next sequential data piece. It is then seen that using this idea, a variety of implementations may be obtained that trade off latency incurred as a result of coding deeper on each bus separately and another type of latency that will occur as a result of signal propagation times due to larger distances in the spatial dimension.

Figure 10:
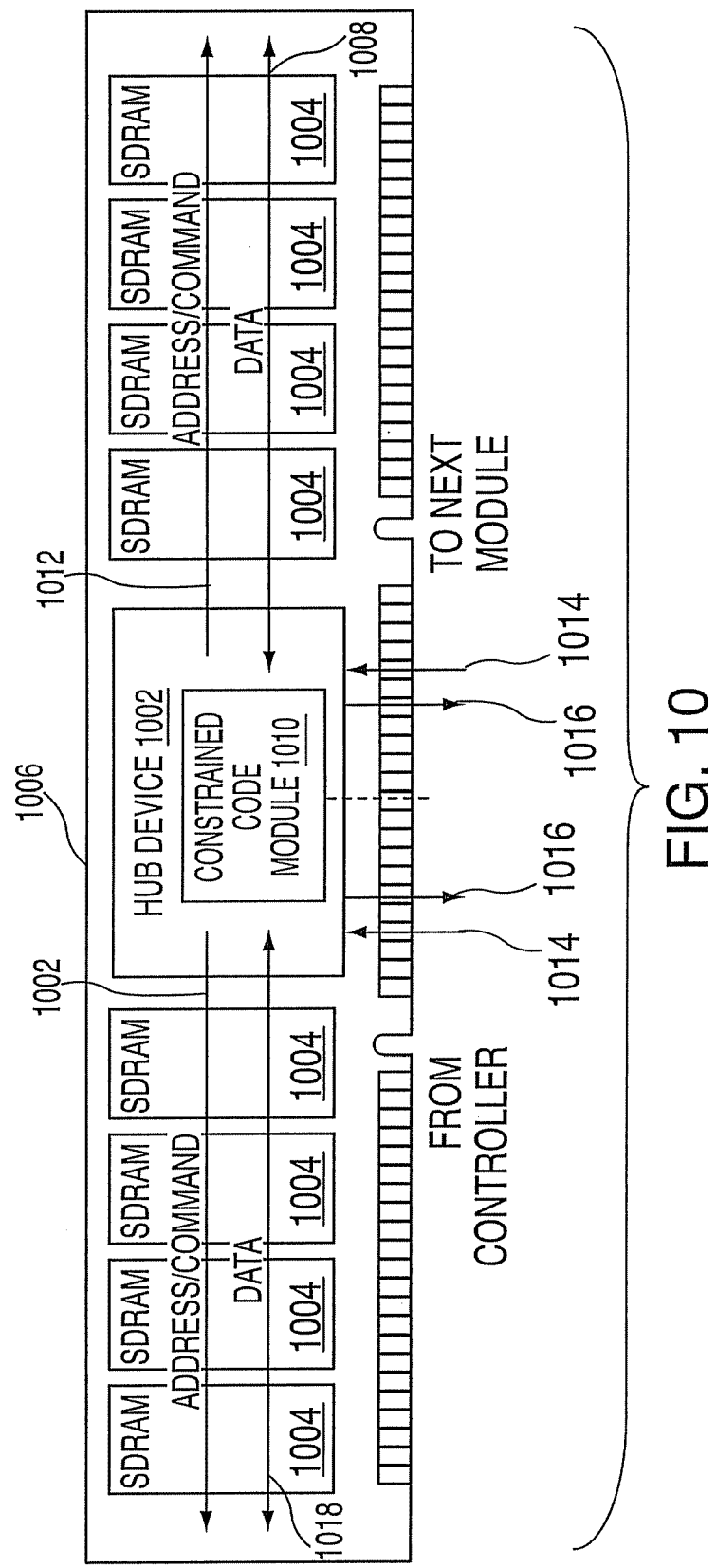
FIG. 10 depicts a buffered memory module that may be implemented by an exemplary embodiment.

FIG. 10 depicts a buffered memory module 1006 that includes a constrained code module 1010 that may be implemented by an exemplary embodiment. FIG. 10 is a pictorial representation of a memory module 1006, with arrows representing the primary signal flows into and out of the hub device 1002. The signal flows include an upstream memory bus 1016, a downstream memory bus 1014, memory device address and command busses 1002 and 1012, and memory device data busses 1008 and 1018. In an exemplary embodiment of the present invention, the hub device 1002 provides two copies of the address and command signals to the memory devices 1004 with the right memory device address and command bus 1012 exiting from the right side of the hub device 1002 for the memory devices 1004 located to the right side and behind the hub device 1002 on the right. A bus converter within the hub device 1002 converts the high speed memory bus data into slower speed address and command signals for communication with the memory devices 1004. The left memory device address and command bus 1002 exits from the left side of the hub device 1002 and connects to the memory devices 1004 to the left side and behind the hub device 1002 on the left. Similarly, the data bits intended for memory devices 1004 to the right of the hub device 1002 exit from the right of the buffer device 1002 on the right memory device data bus 1008. The data bits intended for the left side of the hub device 1002 exit from the left of the hub device 1002 on the left memory device data bus 1018. The high speed upstream memory bus 1016 and downstream memory bus 1014 exit from the lower portion of the hub device 1002, and connect to a memory controller or other memory modules either upstream or downstream of this memory module 1006, depending on the application. The hub device 1002 receives signals that are four times the memory module data rate and converts them into signals at the memory module data rate.

In an exemplary embodiment, all or a subset of the memory devices 1004 are accessed in parallel via the memory device data busses 1008 and 1018. The constrained code module 1010 is utilized to the perform the encoding and decoding described herein for data being transmitted via the device data busses 1003 and 1018. In an exemplary embodiment, data received at the hub device 1002 is encoded by the constrained code module 1010 before being stored in the memory devices 1004. In addition, the data is decoded by the constrained code module 1010 after being retrieved from the memory devices 1004 and before being transmitted out of the hub device via the upstream memory bus 1016 or the downstream memory bus 1014. Because the memory devices 1004 are accessed in parallel, the constrained code module 1010 may be implemented in the manner described previously with regard to FIGS. 8 and 9 where each parallel bus represents a different memory device 1004. If the memory devices are accessed individually, the constrained code module 1010 may be implemented in the manner described previously with regard to FIG. 3.

Figure 11:
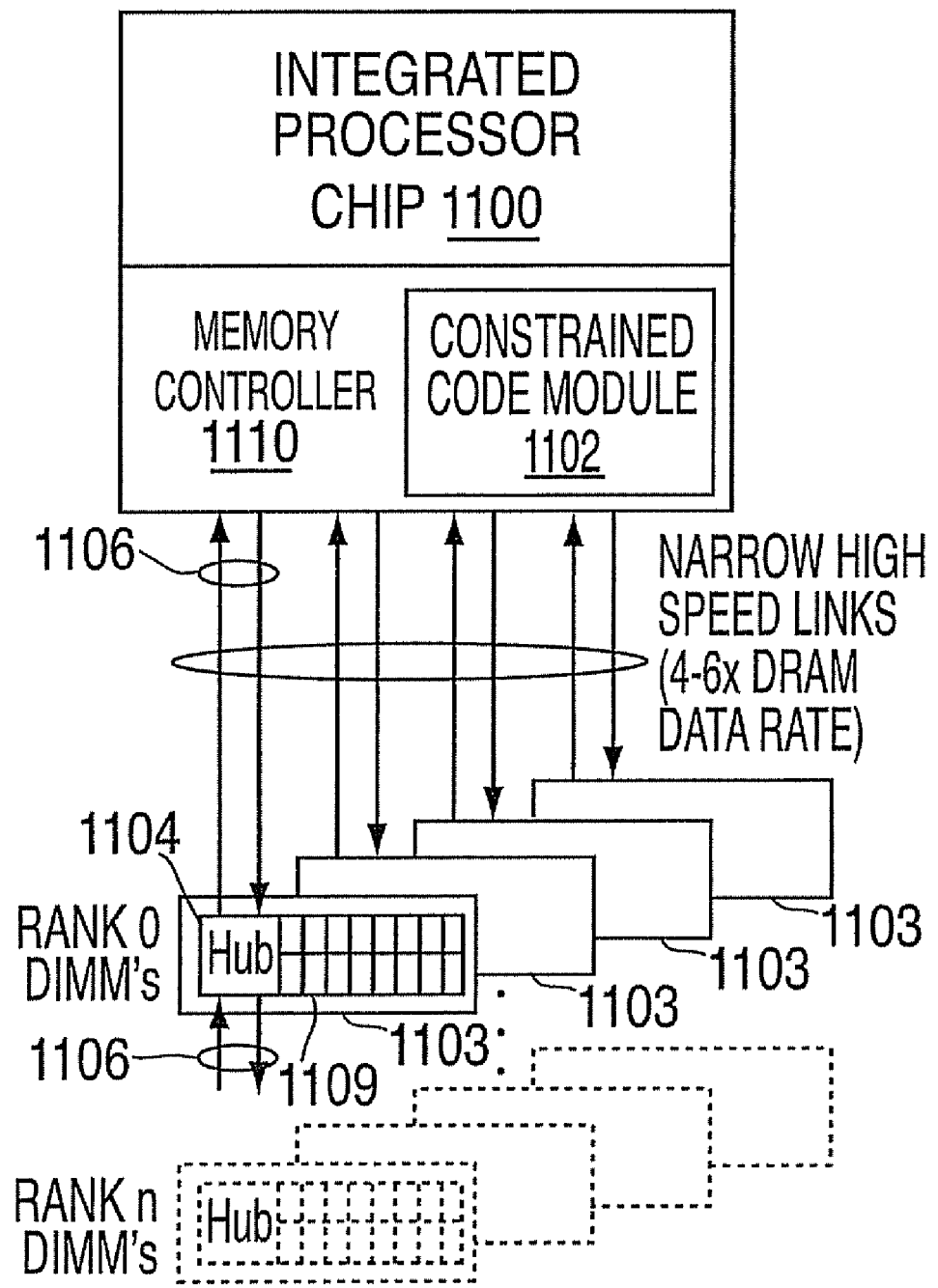
FIG. 11 depicts a cascade interconnect memory system that may be implemented by an exemplary embodiment.

FIG. 11 depicts a cascade interconnect memory system that may be implemented by an exemplary embodiment. FIG. 11 depicts a contemporary system composed of an integrated processor chip 1100, which contains one or more processor elements and an integrated memory controller 1110. Multiple independent cascade interconnected memory interface busses 1106 are logically aggregated together to operate in unison to support a single independent access request at a higher bandwidth with data and error detection/correction information distributed or "striped" across the parallel busses and associated devices. The memory controller 1110 attaches to four narrow/high speed point-to-point memory busses 1106, with each bus 1106 connecting one of the several unique memory controller interface channels to a cascade interconnect memory subsystem 1103 (or memory module, e.g., a DIMM) which includes at least a hub device 1104 and one or more memory devices 1109. Some systems further enable operations when a subset of the memory busses 1106 are populated with memory subsystems 1103. In this case, the one or more populated memory busses 1108 may operate in unison to support a single access request.

In the exemplary embodiment depicted in FIG. 11, the memory controller 1110 includes a constrained code module 1102 for performing the constraint code processing described herein. In an exemplary embodiment, the constrained code module 1102 is utilized to encode data at the memory controller 11110 before it is sent to the hub devices 1104 for storage in the memory devices 1109. The hub devices 1104 then access the memory devices 1109 and store the encoded data. When data is retrieved from the memory devices 1109, the encoded data is sent to the memory controller where the constrained code module 1102 decodes the data.

In an exemplary embodiment, hub devices may be connected to the memory controller through a multi-drop or point-to-point bus structure (which may further include a cascade connection to one or more additional hub devices). Memory access requests are transmitted by the memory controller through the bus structure (e.g., the memory bus) to the selected hub(s). In response to receiving the memory access requests, the hub device translates the memory access requests to control the memory devices to store write data from the hub device or to provide read data to the hub device. Read data is encoded into one or more communication packet(s) and transmitted through the memory bus(ses) to the memory controller.

In alternate exemplary embodiments, the memory controller(s) may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed links to connect to one or more hub chips and/or memory devices.

The memory modules may be implemented by a variety of technology including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. DIMMs have been constructed with pincounts ranging from 100 pins to over 300 pins. In exemplary embodiments described herein, memory modules may include two or more hub devices.

In exemplary embodiments, the memory bus is constructed using multi-drop connections to hub devices on the memory modules and/or using point-to-point connections. The downstream portion of the controller interface (or memory bus), referred to as the downstream bus, may include command, address, data and other operational, initialization or status information being sent to the hub devices on the memory modules. Each hub device may simply forward the information to the subsequent hub device(s) via bypass circuitry; receive, interpret and re-drive the information if it is determined to be targeting a downstream hub device; re-drive some or all of the information without first interpreting the information to determine the intended recipient; or perform a subset or combination of these options.

The upstream portion of the memory bus, referred to as the upstream bus, returns requested read data and/or error, status or other operational information, and this information may be forwarded to the subsequent hub devices via bypass circuitry; be received, interpreted and re-driven if it is determined to be targeting an upstream hub device and/or memory controller in the processor complex; be re-driven in part or in total without first interpreting the information to determine the intended recipient; or perform a subset or combination of these options.

In alternate exemplary embodiments, the point-to-point bus includes a switch or bypass mechanism which results in the bus information being directed to one of two or more possible hub devices during downstream communication (communication passing from the memory controller to a hub device on a memory module), as well as directing upstream information (communication from a hub device on a memory module to the memory controller), often by way of one or more upstream hub devices. Further embodiments include the use of continuity modules, such as those recognized in the art, which, for example, can be placed between the memory controller and a first populated hub device (i.e., a hub device that is in communication with one or more memory devices), in a cascade interconnect memory system, such that any intermediate hub device positions between the memory controller and the first populated hub device include a means by which information passing between the memory controller and the first populated hub device can be received even if the one or more intermediate hub device position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include main memory storage devices.

In exemplary embodiments, the memory system includes one or more hub devices on one or more memory modules connected to the memory controller via a cascade interconnect memory bus, however other memory structures may be implemented such as a point-to-point bus, a multi-drop memory bus or a shared bus Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices, or stubs. However, when used in systems requiring communication with multiple devices or subsystems, this method will often result in significant added component cost and increased system power, and may reduce the potential memory density due to the need for intermediate buffering and/or re-drive.

Although not shown in the Figures, the memory modules or hub devices may also include a separate bus, such as a 'presence detect' bus, an I2C bus and/or an SMBus which is used for one or more purposes including the determination of the hub device an/or memory module attributes (generally after power-up), the reporting of fault or status information to the system, the configuration of the hub device(s) and/or memory subsystem(s) after power-up or during normal operation or other purposes. Depending on the bus characteristics, this bus might also provide a means by which the valid completion of operations could be reported by the hub devices and/or memory module(s) to the memory controller(s), or the identification of failures occurring during the execution of the main memory controller requests.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Memory devices, hubs, buffers, registers, clock devices, passives and other memory support devices and/or components may be attached to the memory subsystem and/or hub device via various methods including solder interconnects, conductive adhesives, socket structures, pressure contacts and other methods which enable communication between the two or more devices via electrical, optical or alternate means.

The one or more memory modules (or memory subsystems) and/or hub devices may be electrically connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc. Electrical interconnections on a memory module are often referred to as contacts, or pins, or tabs. Electrical interconnections on a connector are often referred to as contacts or pins.

As used herein, the term memory subsystem refers to, but is not limited to: one or more memory devices; one or more memory devices and associated interface and/or timing/control circuitry; and/or one or more memory devices in conjunction with a memory buffer, hub device, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry. The memory modules described herein may also be referred to as memory subsystems because they include one or more memory devices and hub devices.

Additional functions that may reside local to the memory subsystem and/or hub device include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) are attached, or may be mounted to a separate interposer or substrate also produced using one or more of various plastic, silicon, ceramic or other materials which include electrical, optical or other communication paths to functionally interconnect the support device(s) to the memory device(s) and/or to other elements of the memory or computer system.

Information transfers (e.g. packets) along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency (ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the pattern consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency (ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Technical effects and benefits include that it requires minimal support at the DRAM device, it is applicable both when the redundant cells are guaranteed to be good at fabrication time or when some of them may be bad, and it can be implemented at the system level without interruption of memory system operation. This may lead to significant improvements in memory system availability and serviceability.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for providing low latency constrained coding for parallel busses, the method comprising:
   receiving a value for a number of transfers, and a number of possible constrained patterns between adjacent transfer rows;
   receiving data to be encoded;
   converting the data into indices of constrained patterns, the converting including a number base change into a new base, wherein the new base is chosen so as to optimize the number of operations required to perform the converting subject to the new base being at least as large as the number of possible constrained patterns between adjacent transfer rows;
   converting the indices of the constrained pattern into encoded data; and
   outputting the encoded data.

2. The method of claim 1 wherein the number base change is performed using binary shift and arithmetic add operations, and the optimization of the number of operations is accomplished by minimizing the number of binary shift and arithmetic add operations.

3. The method of claim 1 wherein, the number of possible constrained patterns between adjacent transfers is equal to "m", the data to be encoded is in base two, and the base change operation receives the data to be encoded in base two and outputs the indices of the constrained pattern in base "m".

4. The method of claim 1 wherein the constrained pattern includes a limited transition weight constraint.

5. The method of claim 1 wherein the constrained pattern includes a minimum transition weight constraint.

6. The method of claim 1 wherein the encoded data is output to different transfers on a parallel bus.

7. The method of claim 1 wherein the encoded data is output to the same transfer on a plurality of parallel busses.

8. The method of claim 1 wherein the converting the indices of the constrained pattern into encoded data is performed using enumerative source coding.

9. A system for providing low latency constrained coding for parallel busses, the system comprising:
   an outer encoder for converting the data into indices of constrained patterns, the converting including a number base change into a new base, wherein the new base is chosen so as to optimize the number of operations required to perform the converting subject to the new base being at least as large as the number of possible constrained patterns between adjacent transfer rows; and
   a plurality of inner encoders for converting the indices of the constrained pattern into encoded data and for outputting the encoded data.

10. The system of claim 9 wherein the number base change is performed with low latency by a circuit that is arranged as a tree.

11. The system of claim 9 wherein the number base change is accomplished using binary shift and arithmetic add operations, and wherein the optimization of the number of operations is accomplished by minimizing the number of binary shift and arithmetic add operations.

12. The system of claim 9 wherein the encoded data is output to different transfers on a parallel bus.

13. The system of claim 9 wherein the encoded data is output to the same transfer on a plurality of parallel busses.

14. The system of claim 9 wherein the converting the indices of the constrained pattern into encoded data is performed using enumerative source coding.

15. The system of claim 9 further comprising a decoder that includes an inner decoder and an outer decoder, wherein the inner decoder converts encoded data into indices of constrained patterns, the outer decoder performs a number base change operation to recover the encoded data, and the new base is binary.

16. A hub device in a memory system, the hub device comprising:
    an interface to one or more memory devices via one or more parallel memory device busses;
    an interface to a memory bus for receiving data;
    an outer encoder for converting the data into indices of constrained patterns, the converting including a number base change into a new base, wherein the new base is chosen so as to optimize the number of operations required to perform the converting subject to the new base being at least as large as the number of possible constrained patterns between adjacent transfer rows; and
    a plurality of inner encoders for converting the indices of the constrained pattern into encoded data and for outputting the encoded data to one or more of the parallel memory device busses.

17. The hub device of claim 16 wherein the number base change is performed with low latency by a circuit that is arranged as a tree.

18. The hub device of claim 16 wherein the encoded data is output to different transfers on one of the parallel memory device busses.

19. The hub device of claim 16 wherein the encoded data is output to the same transfer on a plurality of the parallel memory device busses.

20. The hub device of claim 16 wherein the converting the indices of the constrained pattern into encoded data is performed using enumerative source coding.

* * * * *